United States Patent
Riedl

(10) Patent No.: US 8,136,840 B2
(45) Date of Patent: Mar. 20, 2012

(54) HEIGHT ADJUSTABLE SUPPORT FOR SEMITRAILERS

(75) Inventor: Reinhold Riedl, Miltenberg (DE)

(73) Assignee: SAF-Holland GmbH, Bessenbach (DE)

( * ) Notice: Subject to any disclaimer, the term of this patent is extended or adjusted under 35 U.S.C. 154(b) by 18 days.

(21) Appl. No.: 12/991,317

(22) PCT Filed: Feb. 10, 2010

(86) PCT No.: PCT/EP2010/051654
§ 371 (c)(1),
(2), (4) Date: Nov. 5, 2010

(87) PCT Pub. No.: WO2010/105880
PCT Pub. Date: Sep. 23, 2010

(65) Prior Publication Data
US 2011/0057430 A1 Mar. 10, 2011

(30) Foreign Application Priority Data

Mar. 16, 2009 (DE) .................... 20 2009 003 719 U
May 13, 2009 (DE) .................... 20 2009 006 892 U
Jul. 22, 2009 (DE) .................... 20 2009 009 952 U

(51) Int. Cl.
*B60S 9/04* (2006.01)
(52) U.S. Cl. ............... 280/766.1; 280/763.1; 280/6.153; 254/419; 254/425
(58) Field of Classification Search ............... 280/6.153, 280/763.1, 766.1, 765.1
See application file for complete search history.

(56) References Cited

U.S. PATENT DOCUMENTS

| | | | | |
|---|---|---|---|---|
| 4,706,936 A * | 11/1987 | Riedl | ........................... | 254/89 R |
| 4,828,308 A * | 5/1989 | Riedl | ........................... | 294/81.53 |
| 5,199,738 A * | 4/1993 | VanDenberg | .............. | 280/766.1 |
| 5,238,266 A * | 8/1993 | VanDenberg | .............. | 280/766.1 |
| 5,538,225 A * | 7/1996 | VanDenberg | ................ | 254/419 |
| 6,684,726 B2 * | 2/2004 | Schmidt et al. | ................ | 74/342 |
| 6,846,016 B2 * | 1/2005 | VanDenberg et al. | ...... | 280/763.1 |
| 6,994,325 B2 * | 2/2006 | Riedl | ........................... | 254/419 |
| 7,083,196 B2 * | 8/2006 | Riedl | ........................... | 280/763.1 |
| 7,152,848 B2 * | 12/2006 | Pfleging et al. | ............... | 254/419 |

(Continued)

FOREIGN PATENT DOCUMENTS

DE 8813558 U1 10/1988

(Continued)

*Primary Examiner* — J. Allen Shriver, II
*Assistant Examiner* — James Triggs
(74) *Attorney, Agent, or Firm* — Price Heneveld LLP

(57) ABSTRACT

A height-adjustable support (10) for semi-trailers or the like, comprising a support outer tube (13) which can be fastened to a chassis of the semi-trailer, a slidable support inner tube (14) arranged in the support outer tube (13), at whose lower end region a foot (15) is fastened and which is connected with a nut (17) located on a spindle (16) which is drivable by means of a transmission
wherein the transmission has at least a bevel gear stage (20, 24) and a shiftable transmission area located upstream having gearwheels with spur toothing for a fast-gear operation and a low-gear operation, and wherein the at least present gearwheels and pinions, i.e. a fast-gear gearwheel (29) with a fast-gear pinion (23), a low-gear pinion (25*b*) with a low-gear intermediate gearwheel (30*a*) as well as a low-gear intermediate pinion (30*c*) with a low-gear gearwheel (22) of the transmission area located upstream are arranged in pairs in at least three different vertical planes distributed within and/or in front of the support outer tube (13).

14 Claims, 3 Drawing Sheets

U.S. PATENT DOCUMENTS

| | | | |
|---|---|---|---|
| 7,395,993 B2 * | 7/2008 | Riedl | 248/188.8 |
| 7,398,959 B2 * | 7/2008 | VanDenberg et al. | 254/419 |
| 7,575,249 B2 * | 8/2009 | Riedl | 280/763.1 |
| 2003/0168648 A1 * | 9/2003 | Gallego et al. | 254/419 |
| 2004/0075262 A1 * | 4/2004 | Alguera et al. | 280/766.1 |
| 2005/0155453 A1 * | 7/2005 | Riedl | 74/625 |
| 2005/0161656 A1 * | 7/2005 | Riedl | 254/419 |
| 2005/0253126 A1 * | 11/2005 | BarBaruolo | 254/419 |
| 2005/0285380 A1 * | 12/2005 | Stanczak | 280/763.1 |
| 2006/0119072 A1 * | 6/2006 | Riedl | 280/475 |
| 2006/0119089 A1 * | 6/2006 | Rivers et al. | 280/763.1 |
| 2006/0202460 A1 * | 9/2006 | Baxter et al. | 280/763.1 |
| 2006/0202461 A1 * | 9/2006 | Baxter et al. | 280/766.1 |
| 2007/0152437 A1 * | 7/2007 | Baxter et al. | 280/763.1 |
| 2008/0315570 A1 * | 12/2008 | Baxter | 280/766.1 |
| 2009/0008917 A1 * | 1/2009 | Daniel | 280/766.1 |
| 2009/0321696 A1 * | 12/2009 | Birkholz et al. | 254/419 |
| 2010/0164213 A1 * | 7/2010 | Riedl | 280/766.1 |
| 2011/0057430 A1 * | 3/2011 | Riedl | 280/766.1 |
| 2011/0115205 A1 * | 5/2011 | Riedl | 280/766.1 |
| 2011/0266784 A1 * | 11/2011 | Riedl | 280/763.1 |

FOREIGN PATENT DOCUMENTS

| | | |
|---|---|---|
| DE | 19836635 A1 | 2/2000 |
| DE | 20305175 U1 | 3/2003 |
| EP | 0972689 A2 | 7/1999 |

* cited by examiner

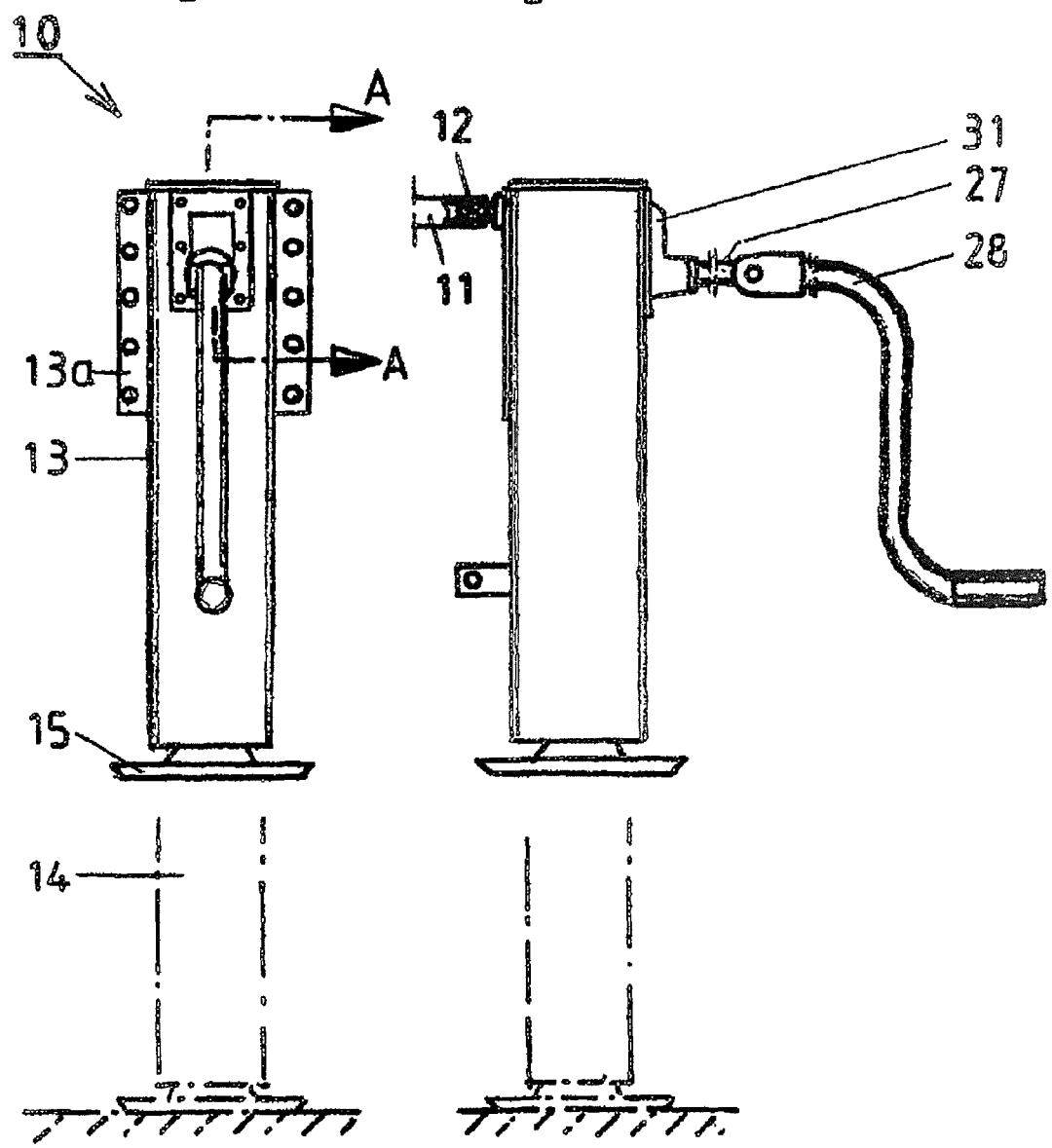

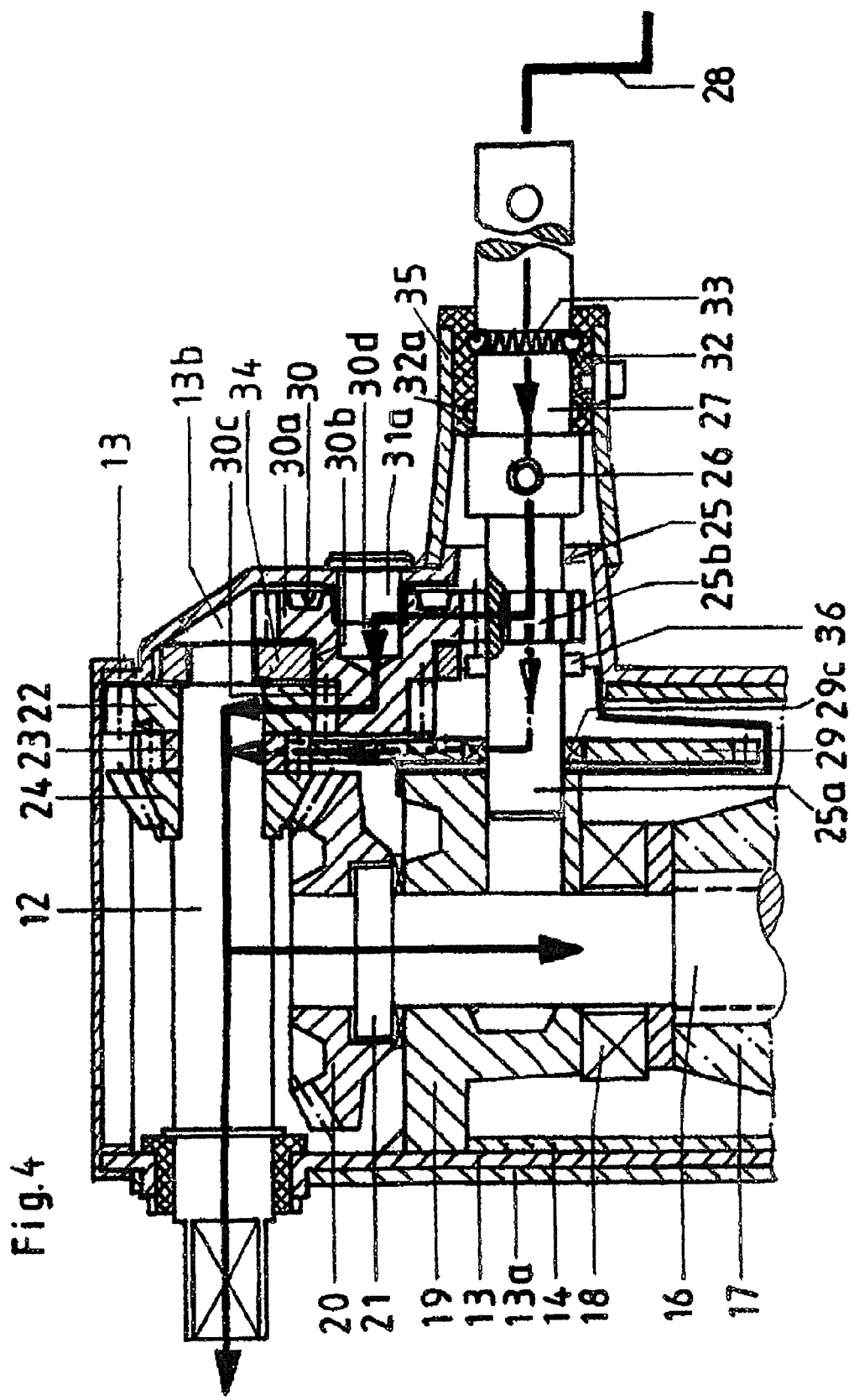

HEIGHT ADJUSTABLE SUPPORT FOR SEMITRAILERS

BACKGROUND OF THE INVENTION

The invention relates to a height-adjustable support for semi-trailers or the like. Such supports are attached in pairs at the front of semi-trailers and, in the fast gear, can be brought into the support or transport position and, in the low gear, can be used to lift the front region of the semi-trailer, should this be necessary for hitching.

Exemplary supports are known from EP 0 972 689 B1 and DE 88 13 558 U1. In each of these supports, a diameter-sized spur gearwheel is located on the output shaft for the low gear, which is covered by the housing of a transmission seated on the outside on the shaft tube. Thus, it results that between the center of the output shaft and the upper edge of the transmission housing there is a large distance which unfavorably increases the construction height of these supports. A further prior art document is DE 198 36 635 C5. In this so-called device for supporting a semi-trailer of a semi-trailer towing vehicle, a diameter-sized low-gear gearwheel is seated on an output shaft or transmission driven shaft, respectively, wherein the gearwheel is arranged in a plane extending vertically within the outer sleeve and covered by a hood. Also in this device the distance between the center of the output shaft and its upper end is unfavorably great. The disadvantages described are representative of the supports for semi-trailers available on the market in that they increase the overall construction height in the upwards direction and in that they make little use of the available building space so that they provide little design flexibility when it comes to extending the semi-trailer. This is particularly blatant in the case of large-capacity semi-trailers whose frames are necessarily extremely low-lying. Here, only supports with a small overall construction height can be employed. If, however, above the output shaft there is already a construction height proportion which is not used as lifting height, a small overall construction height can only be achieved by reducing the lifting height of the extendable and retractable support part. This means that the ground clearance for operation cannot be optimal or becomes totally impermissible, thus rendering the use of the support impossible.

It is an object of the invention to provide a height-adjustable support for semi-trailers or the like, where the construction height proportion, defined as the distance between the center of the output shaft and its upper end, is favorably and clearly smaller than in conventional supports and which support has a compact design and can be manufactured cost-effectively.

SUMMARY OF THE INVENTION

According to the invention there is provided a height-adjustable support for semi-trailers or the like, comprising a support outer tube which can be fastened to a chassis of the semi-trailer or is attached to it stationarily, respectively, a slidable support inner tube arranged in the support outer tube, at whose lower end region a foot is attached and which is connected with a nut located on a spindle which is drivable by means of a transmission, wherein the transmission has at least a bevel gear stage and a shiftable transmission area located upstream having gearwheels with spur toothing for a fast-gear operation and a low-gear operation, wherein the at least present gearwheels and pinions, i.e. a fast-gear gearwheel with a fast-gear pinion, a low-gear pinion with a low-gear intermediate gearwheel as well as a low-gear intermediate pinion with a low-gear gearwheel of the transmission area located upstream are arranged in pairs in at least three different vertical planes distributed within and/or in front of the support outer tube.

Expediently, the at least present gearwheels and pinions are arranged in pairs distributed in at least three different vertical planes in the front region of the support within and/or in front of the support outer tube. In the support according to the invention, for an advantageously compact construction, no diameter-sized gearwheel is necessary on the output shaft of the transmission, wherein the gearwheel increases the construction height not used as lifting height. Thus, it is advantageously made possible that the support with respect to the output shafts can be mounted higher on the semi-trailer, thereby achieving the required ground clearance. To this end, it is proposed to design the area of the transmission with the gearwheels with spur toothing in such a way that the at least present gearwheels and pinions are arranged in pairs in several vertical planes distributed in the front region of the support within the support outer tube and in front of the support outer tube, or within the exit cross-section or regular cross-section, respectively, of the support outer tube and in a local shaped region of the front wall of the support outer tube. Thus, the at least present gearwheels and pinions can be arranged in pairs in at least three different vertical planes distributed within the exit cross-section of the support outer tube and in front of the support outer tube or in a shaped region of the front wall of the support outer tube.

Advantageously, at least the low-gear region with the spur-toothed gearwheels is two-stage. If at least the low-gear region is designed to be two-stage, the low-gear gearwheel, which is seated on the output shaft at the bevel pinion, which is also necessarily mounted there, can preferably be dimensioned with such a small diameter that it does not at all or only slightly extends beyond the bevel pinion. Thus, the disadvantages discussed with respect to conventional supports are avoided.

Expediently, the fast-gear gearwheel is supported in a rotating manner on the pinion coupling part and permanently engages with the fast-gear pinion.

Preferably, the fast-gear gearwheel with the fast-gear pinion and the low-gear intermediate pinion with the low-gear gearwheel are each located in a vertical plane within the regular cross-section of the support outer tube, and the toothing of the low-gear pinion with the low-gear intermediate gearwheel is arranged in a vertical plane in front of the support outer tube.

Preferentially, the fast-gear gearwheel and the fast-gear pinion as well as the low-gear intermediate pinion and the low-gear gearwheel are each located in a vertical plane within the regular cross-section of the support outer tube, and the toothing of the low-gear pinion with the low-gear intermediate pinion is arranged in a vertical plane within an expediently local shaped region of the front wall of the support outer tube.

Preferably, the fast-gear gearwheel and the fast-gear pinion as well as a low-gear intermediate pinion and the low-gear gearwheel should each be arranged in a vertical plane within the exit cross-section or regular cross-section, respectively, of the support outer tube, and the low-gear pinion and a low-gear intermediate gearwheel should be placed in a vertical plane in front of the support outer tube or in its shaped region, respectively.

Advantageously, in the support outer tube there is fastened at least a bearing part for the low-gear intermediate gearwheel set and/or an output shaft.

Expediently, a bearing sleeve for supporting a driving piece is provided, wherein the bearing sleeve is fastened to the outside of the shaped region of the support outer tube permanently and/or in a hermetically sealed manner. Thus, at the outside of the shaped region of the support outer tube, a bearing sleeve can be fastened permanently, whereby advantageously the transmission can be designed in a closed manner.

Preferably, the low-gear intermediate gearwheel and the low-gear intermediate pinion are designed as a one-piece low-gear intermediate gearwheel set. Thus, in the low-gear region of the transmission preferably a one-piece or one-part or integral intermediate gearwheel set can be provided. Expediently, the low-gear intermediate gearwheel and the low-gear intermediate pinion are united on a low-gear intermediate gearwheel set.

Advantageously, the low-gear intermediate gearwheel set has a bearing region between the low-gear intermediate pinion and the low-gear intermediate gearwheel.

Expediently, the low-gear intermediate gearwheel set is supported in the area of the front wall of the support outer tube and in a cap bearing part.

The intermediate gearwheel set is preferably supported either in the front wall region of the support outer tube and in a cap bearing part fastened to the support outer tube, or in a bearing part fastened in the support outer tube and in the shaped region of the wall of the support outer tube.

Preferably, the low-gear intermediate gearwheel set has an inner bearing region.

Advantageously, the low-gear intermediate gearwheel set is supported at one side on a king pin, which is attached to a cap bearing part or in the front wall region of the support outer tube. It contributes to the compact design if the intermediate gearwheel set is supported on the support front side by means of a king pin.

In a preferred embodiment the low-gear gearwheel, the fast-gear pinion and the bevel pinion form one part.

Expediently, the outer diameter of the low-gear gearwheel does not or not substantially exceed the largest diameter of the bevel pinion.

Further advantages and features of the invention result from the following description of preferred embodiments with reference to the written specification, claims and drawings, wherein individual features of different embodiments may be combined to form new embodiments. The Figures show:

BRIEF DESCRIPTION OF THE DRAWINGS

FIG. 1 is a front elevational view of a preferred embodiment of the support according to the invention;

FIG. 2 is a side elevational view of the support shown in FIG. 1;

FIG. 4 is an enlarged cross-sectional side view of an alternative embodiment of the support according to the invention, taken along the line A-A shown in FIG. 1.

DETAILED DESCRIPTION OF THE PREFERRED EMBODIMENTS

Figure 3:
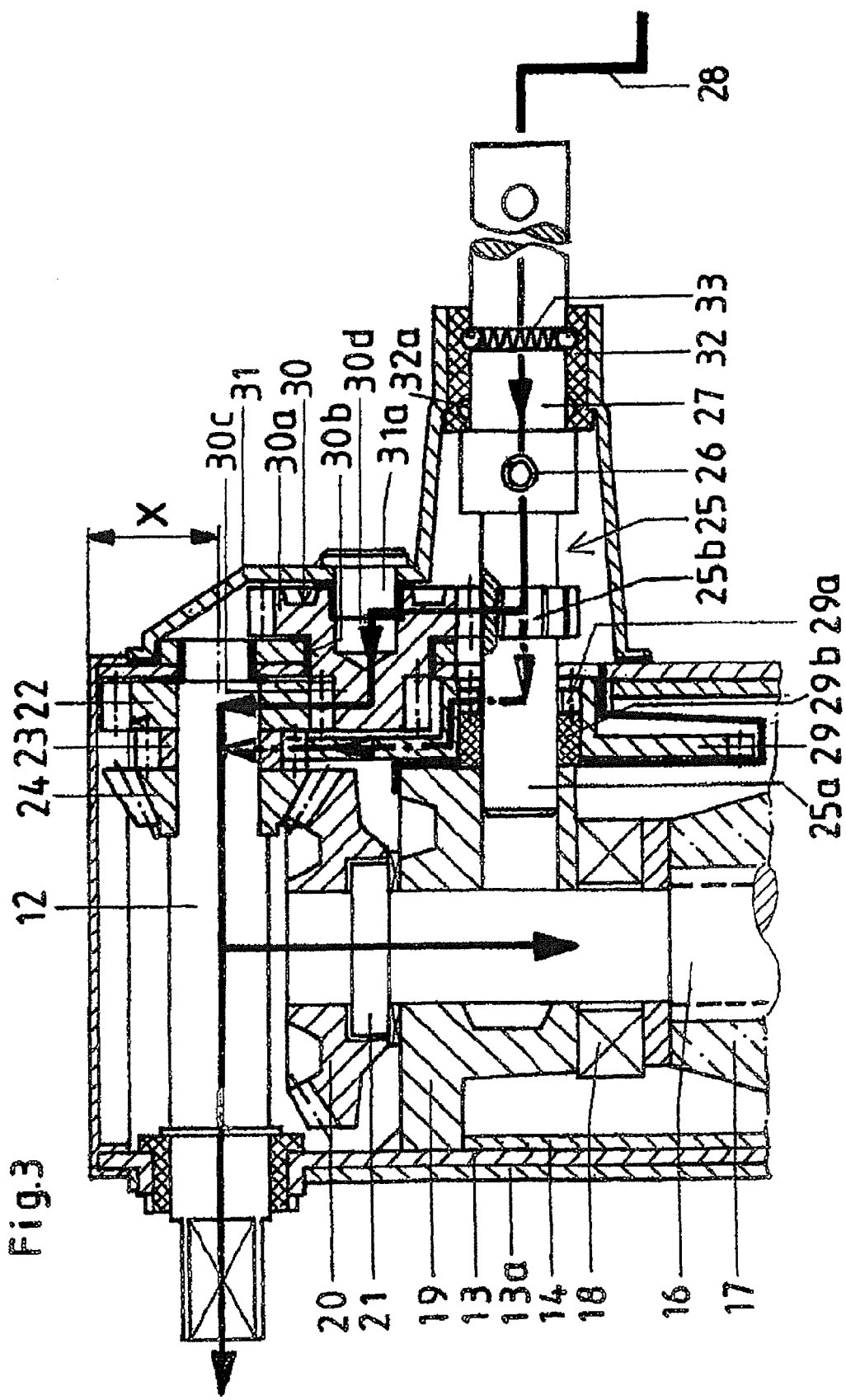
FIG. 3 is an enlarged cross-sectional side view of the support according to the invention, taken along the line A-A shown in FIG. 1.

The support 10 shown in FIGS. 1 to 4 is employed in pairs on a semi-trailer, wherein each pair is drivingly connected to one another by means of a connecting shaft 11 between the output shafts 12. In the transport position, the supports are retracted, i.e. in their shortened state. Prior to uncoupling the semi-trailer from the road tractor, the supports 10 are extended.

The support 10 has a support outer tube 13 and a support inner tube 14 arranged therein such that it is slidable in the longitudinal direction. The support outer tube 13 and the support inner tube 14 have preferably square cross-sections. The support 10 is fastened to the chassis of the semi-trailer by means of a screw plate 13a located on the support outer tube 13. At the lower end of the support inner tube 14 there is a foot 15 for placement on the ground.

As is depicted in FIG. 3, the support 10 has a spindle with a nut 17. The nut 17 is connected to the support inner tube 14 (not shown). On a disc on the shoulder of the spindle 16 there is seated an axial bearing 18 which is supported on a bearing part 19 fastened in or on the support outer tube 13. Above the bearing part 19 there is a crown wheel 20 which, by means of a pin 21 carrying the spindle 16, is connected in an unrotatable manner with the spindle 16. Above the crown wheel 20 the output shaft 12 is supported in the support outer tube 13.

In the front region of the output shaft 12 are seated, each arranged in an unrotatable manner, a low-gear gearwheel 22, a fast-gear pinion 23 and a bevel pinion 24. The outer diameter of the low-gear gearwheel 22 is designed to be small so that from the center or axis of rotation, respectively, of the output shaft 12 to the upper end of the support 10 there is only a small proportion of the construction height of the size X.

In the bearing part 19, there are supported the spindle 16 vertically and in horizontal arrangement therein an axially slidable pinion coupling part 25. The pinion coupling part 25 has a bearing journal 25a as well as a toothing as low-gear pinion 25b and is connected to a driving piece 27 via a mounting by means of a dowel pin 26. At the outer end of the driving piece 27 a swivel-type hand crank 28 is attached. The bearing journal 25a, apart from supporting the pinion coupling part 25 with its center section, also serves to support a fast-gear gearwheel 29, which is attributed to the fast-gear pinion 23 seated on the output shaft 12. In the fast-gear gearwheel 29 there is a coupling toothing 29a and a bearing bush 29b.

Between the pinion coupling part 25 and the output shaft 12 there is a low-gear intermediate gearwheel set 30 arranged in parallel axis arrangement. The low-gear intermediate gearwheel set 30 consists of a low-gear intermediate gearwheel 30a with which the toothing of the low-gear pinion 25b can act together, a bearing region 30b as well as a low-gear intermediate pinion 30c which engages with the low-gear gearwheel 22. Furthermore, the low-gear intermediate gearwheel set 30 has an inner bearing region 30d at its face end. The low-gear intermediate gearwheel set 30 is supported centrally with its bearing region 30b in the partially reinforced front wall of the support outer tube 13 and at its end with its inner bearing region 30d on a king pin 31a located at a cap bearing part 31. The cap bearing part 31 has a bearing region equipped with a collar bush 32 for the driving piece 27 and a covering region with which it is flanged to the support outer tube 13. In the collar bush 32 there are two radial grooves 32a into which alternatingly a ball stop installed in the drive piece 27 can snap in.

The transmission functions of the support 10 are as follows:

For the low-gear operation the toothing of the low-gear pinion 25b engages or is in engagement position, respectively, with the low-gear intermediate pinion 30a, wherein the ball stop 30 in the driving piece 27 is snapped into the front radial groove 32a for an axial fixing of the pinion coupling part 25. As is shown in FIG. 3 with arrow lines, when cranking the hand crank 28, the power flows first from the driving piece 27 into the pinion coupling part 25 and from there via the toothing of the low-gear pinion 25b further on to the low-gear intermediate gearwheel 30a of the low-gear intermediate gearwheel set 30. The low-gear intermediate pinion 30c transmits the power onto the low-gear gearwheel 22 and, thus, onto the output shaft 12. The power flow branches then into a part which is introduced via the bevel pinion 24 and the crown wheel 20 into the spindle 16 so as to move the nut 17 with the support inner tube 14 fastened thereto, and into a part which is available on the journal of the output shaft 12 for forwarding via the connecting shaft 11 to drive the neighboring support.

In the fast-gear operation the pinion coupling part 25 is displaced in the direction of the center of the support 10 (not shown) so that the toothing of the low-gear pinion 25b with its front region dips into the full depth of the coupling toothing 29a of the fast-gear gearwheel 29, whereby a positive coupling of the pinion coupling part 25 with the fast-gear gearwheel 29 exists. Here, the ball stop 30 is snapped into the rear radial groove 32a. The power flows as is shown in FIG. 3 by means of dot-dashed arrow lines.

Between the shifting position of the pinion coupling part 25 for the low-gear and that for the fast-gear a free-wheel is possible in which the toothing of the low-gear pinion 25b does not engage. During the shifting operation, if necessary, this free-wheel makes it possible to easily engage the pinion coupling part 25 by means of a small idling motion with the coupling toothing 29a of the fast-gear gearwheel 29 or the toothing of the low-gear intermediate gearwheel 30a.

FIG. 4 shows an embodiment of the support 10, wherein the low-gear intermediate gearwheel 30a and the toothing of the engaging low-gear pinion 25b are arranged in a shaped region 13b of the front wall of the support outer tube 13. The low-gear intermediate gearwheel set 30 at or with its front end is supported on the kingpin 31a, which, in this case, is seated in the front wall of the support outer tube 13, and its center bearing region 30b is located in a bearing part 34 which is fastened in the support outer tube 13. The driving piece 27 is supported in the collar bush 32 which can be removed towards the outside and which is arranged in a lockable manner in a bearing sleeve 35. The bearing sleeve 35 is fastened in a hermetically sealed manner to the outside of the shaped region 13b of the support outer tube 13.

On the bearing journal 25a of the pinion coupling part 25 radially protruding carriers 36 are provided. The fast-gear gearwheel 29 has within its bearing hole carrier receiving grooves 29c in which the carriers 36 engage when the pinion coupling part 25 is inserted for the fast-gear operation. The respective power flow in the low-gear operation and in the fast-gear operation of the support 10 is shown in FIG. 4 with arrow lines or with dot-dashed arrow-lines, respectively.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A height-adjustable support for semi-trailers, comprising:
   a support outer tube which can be fastened to a chassis of a semi-trailer;
   a slidable support inner tube arranged in the support outer tube and including a foot fastened to a lower end of the inner tube, wherein the inner tube is connected with a nut to a spindle; and
   a transmission adapted to drive the spindle and including at least a bevel gear stage and a shiftable transmission area located upstream having gearwheels with spur toothing, and pinions,
   wherein the gearwheels and pinions include a fast-gear gearwheel with a fast-gear pinion, a low-gear pinion with a low-gear intermediate gearwheel and a low-gear intermediate pinion with a low-gear gearwheel, arranged in pairs in at least three different vertical planes distributed in at least a select one of within and in front of the support outer tube.

2. The support according to claim 1, wherein at least the low-gear region with the spur-toothed gearwheels (25b, 30a, 30c, 22) has two stages.

3. The support according to claim 1, wherein the fast-gear gearwheel is supported rotatably on a pinion coupling part and permanently engages the fast-gear pinion.

4. The support according to claim 1, wherein the fast-gear gearwheel, the fast-gear pinion, the low-gear intermediate pinion and the low-gear gearwheel are each located in a vertical plane within a regular cross-section of the support outer tube, and the toothing of the low-gear pinion is arranged with the low-gear intermediate gearwheel in a vertical plane in front of the support outer tube.

5. The support according to claim 1, wherein the fast-gear gearwheel, the fast-gear pinion, the low-gear intermediate pinion and the low-gear gearwheel are each located in a vertical plane within a regular cross-section of the support outer tube, and the toothing of the low-gear pinion with the low-gear intermediate gearwheel is arranged in a vertical plane within a shaped region of a front wall of the support outer tube.

6. The support according to claim 1, wherein in the support outer tube there is fastened a bearing part for at least one of the low-gear intermediate gearwheel and low gear intermediate pinion, and the output shaft.

7. The support according to claim 5, wherein a bearing sleeve for supporting a driving piece is provided, and wherein the bearing sleeve is at least a select one of permanently fastened and hermetically sealed to an outside of the shaped region of the support outer tube.

8. The support according to claim 1, wherein the low-gear intermediate gearwheel and the low-gear intermediate pinion comprise a one-piece low-gear intermediate gearwheel set.

9. The support according to claim 8, wherein the low-gear intermediate gearwheel set has a bearing region between the low-gear intermediate pinion and the low-gear intermediate gearwheel.

10. The support according to claim 8, wherein the low-gear intermediate gearwheel set is supported in an area of a front wall of the support outer tube and in a cap bearing part.

11. The support according to claim 8, wherein the low-gear intermediate gearwheel set has an inner bearing region.

12. The support according to claim 8, wherein the low-gear intermediate gearwheel set is supported on one side on a king pin, and wherein the king pin is fastened in at least a select one of to a cap bearing part, and in the front wall area of the support outer tube.

13. The support according to claim 1, wherein the low-gear gearwheel, the fast-gear pinion and the bevel pinion comprise a single, unitary part.

14. The support according to claim 1, wherein an outside diameter of the low-gear gearwheel does not exceed the largest diameter of the bevel pinion.

* * * * *